United States Patent [19]

Hartberg

[11] 4,353,589
[45] Oct. 12, 1982

[54] AIR PERMEABLE CLOSURE ASSEMBLY

[76] Inventor: Bruce L. Hartberg, Heron Lake, Minn. 56137

[21] Appl. No.: 785,239

[22] Filed: Apr. 6, 1977

[51] Int. Cl.³ .............................................. B62D 25/00
[52] U.S. Cl. .................................................... 296/50
[58] Field of Search ............................ 296/50, 51, 37.6

[56] References Cited
U.S. PATENT DOCUMENTS

| 3,131,962 | 5/1964 | St. Clair | 296/50 |
| 3,148,912 | 9/1964 | Curtis et al. | 296/50 |
| 3,548,540 | 12/1970 | Cullings | 296/50 |
| 3,600,032 | 8/1971 | Gross | 296/50 |

Primary Examiner—Richard A. Bertsch

[57] ABSTRACT

A closure device for the rear of a vehicle which is permeable to air. The embodiment shown is a gridded tailgate for a pickup truck. The open grid forming the surface of the tailgate permits the free flow of air through the tailgate which decreases the wind resistance of the vehicle, reduces drag, increases mileage, allows freedom of vision when hooking anything to the rear of the truck and greatly facilitates backing the vehicle.

16 Claims, 7 Drawing Figures

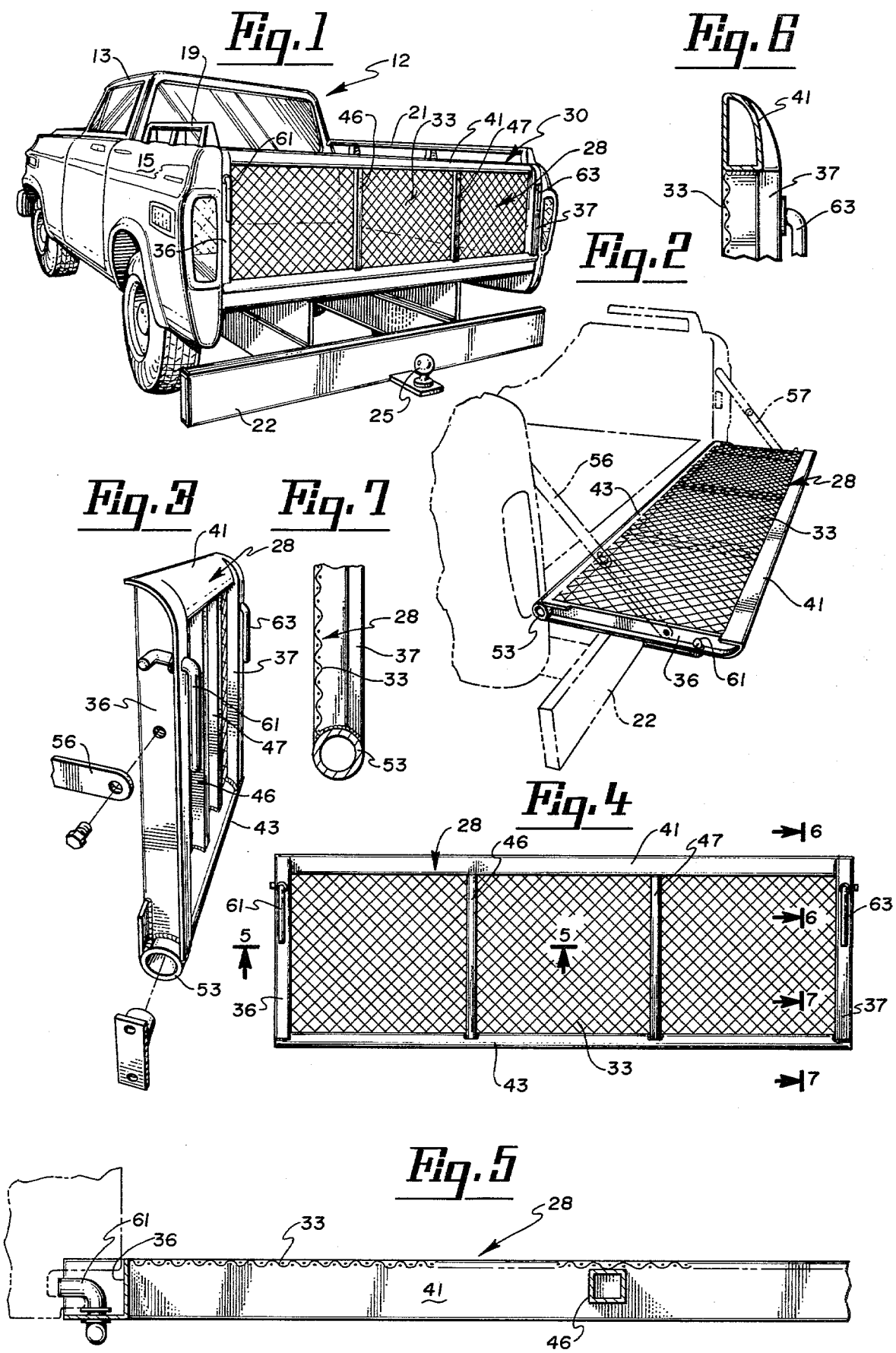

AIR PERMEABLE CLOSURE ASSEMBLY

BACKGROUND OF THE INVENTION

Many attempts in the past have been made to aerodynamically design or modify vehicle shapes to improve the performance of a vehicle at various speeds. The most often attempted design variation was that a redesigning or modifying the shape of a vehicle to reduce wind resistance or drag. Design modifications to achieve those results have been directed primarily to sloped or inclined surfaces at the forward end or the rearward end of the vehicle. For example, there are a number of devices on the market which can be attached to the roof of the cab of a large truck in an attempt to channel air over the forward end of the truck body to reduce air resistance. Similarly, to reduce drag, sloped or inclined surfaces have been provided at the rear of vehicles such as the design of a hatchback automobile.

Understandably, design modifications or changes normally must, of necessity, have increased the weight or the area of the vehicle, if it was attached thereto, or decreased available space, to allow the incorporation of sloping surfaces. In addition, if the aerodynamic modifier was to be attached to an existing structure it normally required some sort of complex fastening means which was sufficient to withstand wind pressures at the anticipated speeds of the vehicle.

SUMMARY OF THE INVENTION

The present invention is a device which substantially improves the performance of a vehicle on which it is installed but which is inexpensively constructed, easily manufactured with a minimum of parts, and dependable in use. It replaces existing structure of the vehicle with a modification which substantially improves airflow through and around the vehicle with a consequence that fuel economy of the vehicle is improved. In addition, the invention is designed for the rear of the vehicle, so that rearward visibility is greatly enhanced for purposes of backing, parking and in hooking implements such as trailers to the rear of the vehicle on which this invention is installed. The invention comprises a frame to which is affixed an air permeable grid or screen which is used as a closure assembly at the rear of the vehicle, for example, as the tailgate in a pickup truck as shown in the drawings and described in the description of the preferred embodiment.

It is an object of the present invention to provide a rear closure assembly which reduces wind resistance of a vehicle.

It is an object of the present invention to provide a rear closure assembly which reduces drag of a vehicle.

It is an object of the present invention to provide a rear closure assembly which provides substantially unobstructed vision through the rear of the vehicle.

It is an object of the present invention to provide a rear closure assembly which allows substantially free flow of air through the rear of the vehicle.

Other objects and advantages of the present invention will become apparent from a consideration of the following description in connection with the drawings.

DESCRIPTION OF THE DRAWINGS

FIG. 1 is a perspective view of a pickup truck which utilizes my invention in an upright position as the tailgate of a pickup truck.

FIG. 2 is a perspective view of the pickup truck shown in FIG. 1, partially broken away, showing my invention in a substantially horizontal position.

FIG. 3 is an end view of my invention showing how it is attached to the body of the truck, and how locking means may be utilized in a manner suitable for a pickup truck manufactured by General Motors.

FIG. 4 is a rear plan view of my invention.

FIG. 5 is a sectional bottom view taken along the line 5—5 in FIG. 4 which demonstrates the relationship of the grid to the framework as well as the operation of the locking assembly into the sidewall of the vehicle.

FIG. 6 is a sectional end view taken along the line 6—6 of FIG. 4 showing the upper portion of the frame and how the grid is affixed thereto.

FIG. 7 is a sectional end view taken along the line 7—7 in FIG. 6 and showing the lower portion of the frame of my invention, how the grid is fastened thereto and how it serves as a bearing to permit my invention to be raised and lowered in the manner of a tailgate for a pickup truck.

DESCRIPTION OF THE PREFERRED EMBODIMENT

Shown in FIG. 1 is a vehicle 12, specifically depicted in FIG. 1 as a pickup truck, having a cab and a bed or open topped body 15 with sidewalls 19, 21 and a rear bumper 22 bearing a trailer hitch 25. While normally the closure assembly at the rearward end of the truck would be a solid metal tailgate, FIG. 1 shows the improvement which is my invention which is a closure assembly 28 which comprises a frame 30 which is connectable to the rear of the truck and which has a permeable member 33 attached to and covering the frame 30. In the embodiment shown the permeable member 33 is a metallic grid which can be flattened, expanded steel mesh.

As shown in the drawings, the closure assembly 28 which is my invention can be constructed of the following materials. The side ends 36, 37 of the frame 30 can be constructed with channeled, structural steel. The top frame 41 member is preferably rectangular steel tubing, while the bottom frame member 43 is preferably round mechanical tube for purposes of pivoting the closure assembly in the manner of a tailgate on a truck. Additional reinforcing is preferably provided by elements of the frame 46, 47 which can be conveniently formed of rectangular steel tubing. Expanded steel mesh which has been flattened and is permeable to air has been found convenient for the grid or mesh 33 which is applied to the frame 30. This allows air which has been channeled into the bed of the truck to flow freely out of the back. The closure assembly 28 can be conveniently attached to commercially available pickup trucks with the use of bearing members 53 also conveniently formed from round mechanical tube and which are secured to the frame 30, preferably by welding. Brackets 56, 57 to limit the downward movement of the tailgate are conventional and can be bolted to the frame 30 of my invention.

Locking mechanisms 61, 63 compatible with commercial trucks can be conveniently provided through the channel of the side of my frame using shaped steel rod, the embodiment shown wherein the end is turned outward being suitable for the locking hardware of a pickup manufactured by General Motors. The end of the locking mechanism can also be conveniently turned inward to utilize existing locking hardware of pickup trucks manufactured by the Ford Motor Company.

As shown in FIGS. 5, 6 and 7, the grid or mesh 33 is preferably attached to the surface of the frame 30 closest the bed of the truck so that it may be utilized during operation to support material when in the position shown in FIG. 2 and to contain material in the truck 12 when utilized in the position shown in FIG. 1. Using the materials specified above, I have found the tailgate to be structurally equivalent to those commercially provided by manufacturers of such vehicles.

Utilizing the closure assembly 28 which is my invention, air traveling over the cab 13 of the truck 12 which would normally create turbulence and a downward force due to its being trapped by the sidewalls 19, 21 and tailgate in the back of the truck, flows freely out of the bed of the truck because of my invention. Air resistance and drag is thus reduced.

From a consideration of the foregoing disclosure it should be obvious that the invention is a simply constructed and economically manufactured mechanism which is not susceptible to the disadvantages of the prior art. It should be understood that modifications and variations may be resorted to without departing from the spirit of the invention as those skilled in the art will readily understand. Such modifications and variations are considered to be within the purview and scope of the present invention as defined by the following claims.

Having described my invention I claim:

1. A closure assembly for the rear of a vehicle having an open top, two solid sidewalls and a flat bed positioned between the sidewalls, comprising:
   a frame;
   means for attaching the frame to the rear of the vehicle so that the frame in is upright position extends between the sidewalls and is positioned immediately above the bed of the vehicle; and
   a permeable member attached to and covering at least a portion of the frame so that air trapped between the sidewalls and bed when the vehicle is in motion can flow through the closure assembly.

2. The closure assembly of claim 1 wherein the permeable member comprises a grid having sufficient permeability to allow air to flow through the closure assembly.

3. The closure assembly of claim 2 wherein the permeable member comprises a grid having sufficient permeability to allow free flow of air through the closure assembly.

4. The closure assembly of claim 1 wherein the permeable member comprises a grid having sufficient permeability to allow substantially unobstructed vision through the closure assembly.

5. The closure assembly of claim 1 wherein the frame comprises means for reinforcing the permeable member whereby the closure assembly is of sufficient rigidity to support substantial weight upon the closure assembly when in a horizontal position.

6. The closure assembly of claim 1 wherein the frame comprises means for reinforcing the permeable member whereby the closure assembly is of sufficient rigidity to contain material in the vehicle when the closure assembly is in an upright position.

7. The closure assembly of claim 1 wherein the means for attaching the frame to the rear of the vehicle comprises means for pivotally attaching the closure assembly to the rear of the vehicle.

8. The closure assembly of claim 1 wherein the closure assembly further comprises locking means attached to the frame to lock the frame and thus the closure assembly to the rear of the vehicle in an upright position.

9. The closure assembly of claim 8 wherein the locking means releasably locks the closure assembly to the rear of the vehicle.

10. The closure assembly of claim 1 wherein the vehicle is a pickup truck and the closure assembly functions as the tailgate of the pickup truck.

11. In a pickup truck of the type having
   an open bed in the rear of the truck;
   solid sidewalls longitudinally positioned adjacent the sides of the bed;
   a tailgate which is adapted to be positioned in an upright position adjacent the rear of the bed and extending between the sidewalls to form a boxlike enclosure around the bed of the truck when the truck is in motion; and
   a cab in the front of the truck which extends above the bed, sidewalls and tailgate and causes air to flow over and around the cab and into the enclosure formed by the bed, sidewalls and tailgate,
the improvement comprising:
   providing apertures in the tailgate of the truck which permit air trapped between the sidewalls and bed of the truck to flow freely through the tailgate whereby aerodynamic performance of the truck is improved.

12. In a vehicle of the type having an open bed and solid sidewalls longitudinally positioned adjacent the sides of the bed, the improvement comprising:
   an air permeable tailgate mounted for pivotal movement about a horizontal axis adjacent the rear of the bed and extending between the sidewalls thereby forming a box-like enclosure when in its upright position, and allowing air to flow therethrough when the vehicle is in motion.

13. A low air drag tailgate construction adapted to be pivotally mounted in the tailgate opening between the truck sidewalls at the trailing end of the open top cargo compartment of a pickup truck on the tailgate mounting brackets provided on the pickup truck in replacement of the conventional tailgate normally associated therewith, said tailgate construction comprising:
   an open frame having a peripheral configuration corresponding generally to the configuration of the tailgate opening to the open top cargo compartment of the pickup truck, said open frame pivotally connected to the trailing end of the pickup truck in lieu of the conventional tailgate for selectively extending around the tailgate opening at the trailing end of the open top cargo compartment, said open frame comprising a pair of spaced apart, parallel generally vertically extending end plates having upper and lower ends; an upper, generally horizontal, tubular edge member extending between and connected to the upper ends of said end plates; a lower, generally horizontal, tubular edge member extending between and connected to said end plates adjacent the lower ends thereof; at least one generally vertically extending tubular brace member extending between and connected to said upper and lower tubular edge members intermediate their ends; and a pair of pivot connectors attached to the lower ends of said end plates and coaxially aligned along a common tailgate pivot axis generally parallel to said upper and lower tubular edge members, said pivot connectors adapted to pivotally connect said open frame to the tailgate mounting brackets on the pickup truck so that said open frame can be pivoted upwardly to a closed position whereby said end plates extend along opposite sides of the tailgate opening, said upper tubular edge member extends along the upper edge of the tailgate opening, and said lower tubular edge member extends along the lower edge of the tailgate opening, said open frame defining an opening therethrough between said end plates, said upper and lower tubular edge members, and said brace member; and an expanded metal screen cover member covering the openings through said open frame and attached to that side of said open frame facing the truck cargo compartment along said end plates, and said upper and lower edge members for retaining cargo in the cargo space, said expanded metal screen cover member defining a plurality of small air passages therethrough so that the size of any one of said air passages is sufficiently small to retain cargo in the cargo compartment yet at least seventy-five percent of the cover member area is open through said air passages to permit air to flow therethrough to reduce the air drag associated therewith, said expanded metal screen cover member constructed and arranged so that it is strong in a direction normal to the plane of said cover member to prevent bending of said cover member when engaged by cargo in the cargo compartment and to reinforce said open frame.

14. The low air drag tailgate construction of claim 13 further including a pair of catch assemblies mounted on said end plates constructed and arranged to selectively hold said open frame in its closed position.

15. The low air drag tailgate construction of claim 14 further including locating means for limiting the pivotal movement of said open frame from its closed position to an open position where said open frame lies in a generally horizontal plane.

16. The low air drag tailgate construction of claim 15 wherein said end plates have a peripheral profile matching the profile of the side walls of the cargo compartment and said end plates are in registration with the side walls at the tailgate opening when said open frame is in its closed position.

* * * * *